United States Patent
Pawar et al.

(10) Patent No.: US 8,340,610 B2
(45) Date of Patent: Dec. 25, 2012

(54) MULTI-CARRIER SELECTION

(75) Inventors: Hemanth Balaji Pawar, Herndon, VA (US); Esmail Hejazi Dinan, Herndon, VA (US); Howard Bishop Anderson, Ashburn, VA (US); Daniel A. Vivanco, Herndon, VA (US); Vijay Rudraraju, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 592 days.

(21) Appl. No.: 12/372,949

(22) Filed: Feb. 18, 2009

(65) Prior Publication Data

US 2010/0210213 A1    Aug. 19, 2010

(51) Int. Cl.
  *H04B 1/18*  (2006.01)

(52) U.S. Cl. .................. 455/188.1; 455/62; 455/456.1

(58) Field of Classification Search ........... 455/188.1, 455/62, 456.1
See application file for complete search history.

(56) References Cited

U.S. PATENT DOCUMENTS

| | | | |
|---|---|---|---|
| 6,714,789 B1 * | 3/2004 | Oh et al. | 455/456.1 |
| 7,366,525 B2 * | 4/2008 | Drury et al. | 455/458 |
| 7,693,527 B2 * | 4/2010 | Krstulich | 455/452.2 |
| 7,920,877 B2 * | 4/2011 | Lan et al. | 455/456.1 |
| 2007/0189320 A1 | 8/2007 | Wu et al. | |

* cited by examiner

*Primary Examiner* — Quan Tra
(74) *Attorney, Agent, or Firm* — O'Brien Jones, PLLC

(57) ABSTRACT

A method of operating a communication system is disclosed. A location associated with a first wireless device is received. For a first frequency band, a first stored signal quality indicator associated with the location is received. For a second frequency band, a second stored signal quality indicator associated with the location is received. Based on the first stored signal quality indicator and the second stored signal quality indicator, the first frequency band is selected.

20 Claims, 6 Drawing Sheets

MULTI-CARRIER SELECTION

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

OVERVIEW

A method of operating a communication system is disclosed. A location associated with a first wireless device is received. For a first frequency band, a first stored signal quality indicator associated with the location is received. For a second frequency band, a second stored signal quality indicator associated with the location is received. Based on the first stored signal quality indicator and the second stored signal quality indicator, the first frequency band is selected.

A method of operating a communication system is disclosed. A plurality of associations between a plurality of signal quality indicators and a plurality of locations are stored. A request to communicate a packet with a wireless device is received. A location associated with the wireless device is determined. Based on the location associated with the wireless device and at least one of the plurality of associations between the plurality of signal quality indicators and the plurality of locations, at least one of the plurality of signal quality indicators is selected. Based on the selected at least one of the plurality of signal quality indicators, a first frequency band is selected.

A communication system is disclosed. A wireless station communicates with a wireless device using a first frequency band and switches to communicating with the wireless device using a second frequency band. The communication system determining a location associated with the wireless device. The communication system retrieves a first stored signal quality indicator associated with the location and the first frequency band. The communication system retrieves a second stored signal quality indicator associated with the location and the second frequency band. Based on the first stored signal quality indicator and the second stored signal quality indicator, the communication system causes the wireless station to switch to communicating with the wireless device using the second frequency band.

DETAILED DESCRIPTION

In an embodiment, a communication system selects a frequency band to be used by a wireless device based on the location of the device, and a database of signal quality indicators. The database of signal quality indicators stores associations between a location, and the signal quality at that location for multiple frequency bands. Thus, the frequency band with the best signal quality at that location may be selected. Once selected, the wireless device is assigned resources on the selected frequency band. If, however, the selected frequency band does not provide adequate signal quality, the wireless device may be switched to a different frequency band.

In an embodiment, to develop the database of signal quality indicators, an inactive wireless device may be controlled to report a location and a signal quality indicator on the frequency band it is using. The wireless device may then be instructed to switch frequency bands and report the signal quality indicator. Thus, a database of signal quality indicators that associates locations, frequency bands, and signal quality may be constructed.

Figure 1:
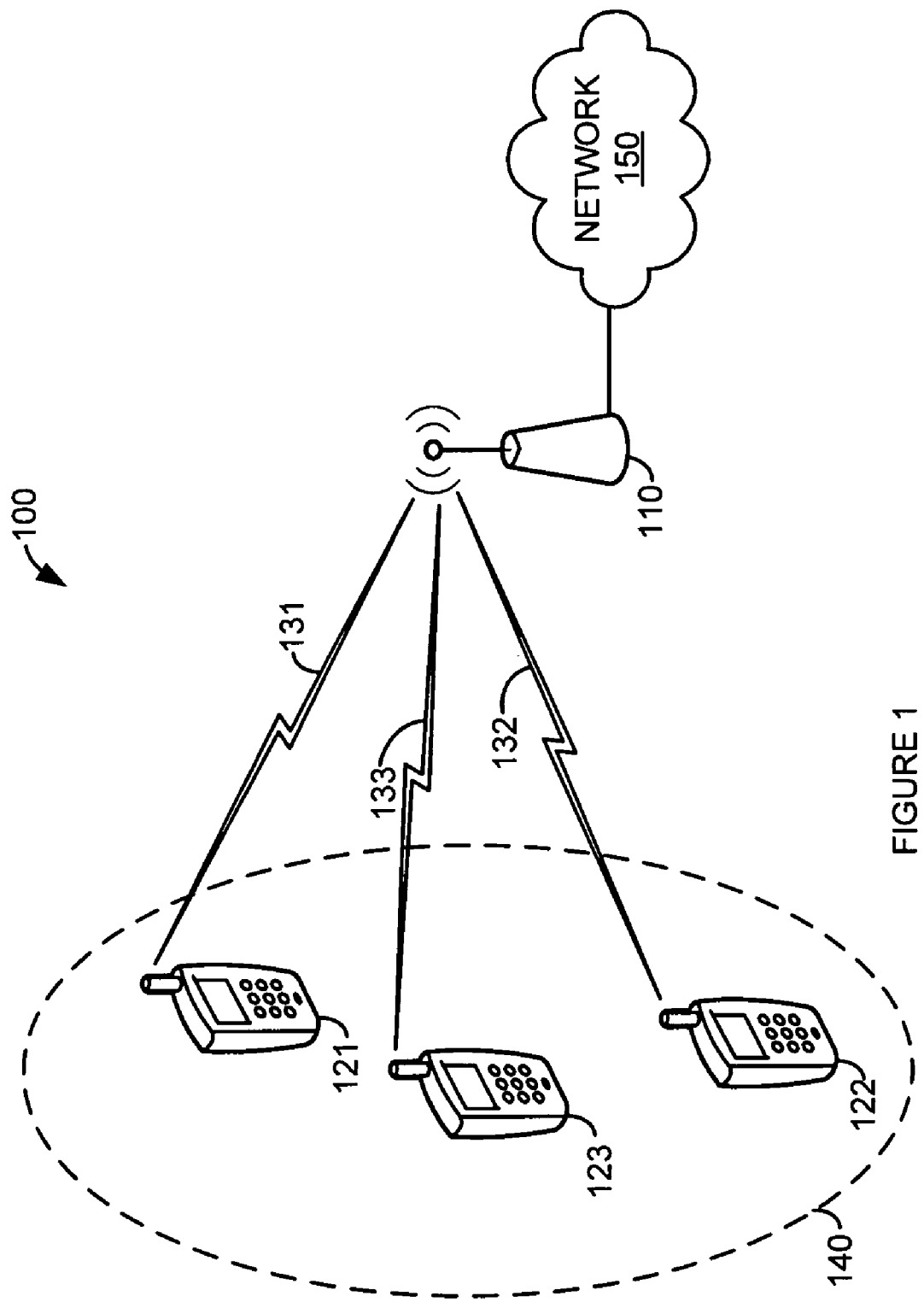
FIG. 1 is a block diagram illustrating a communication system.

FIG. 1 is a block diagram illustrating a communication system. In FIG. 1, communication system 100 comprises: base station 110, wireless device 121, wireless device 122, wireless device 123, and network 150. Wireless devices 121-123 are within defined area 140. Base station 110 is operatively coupled to network 150. Wireless devices 121-123 are operatively coupled to base station 110 via wireless links 131-133, respectively. Thus, wireless devices 121-123 may be operatively coupled to network 150 via base station 110.

Wireless devices 121-123 may be any device, system, combination of devices, or other such communication platform capable of communicating with base station 110 using multiple frequency bands (channels). Wireless devices 121-123 may use communication aspects specified by the WiMAX specification including, but not limited to, the channel bandwidths detailed therein. Wireless devices 121-123 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via multiple channels. Other types of communication platforms are possible.

Base station 110 may be any wireless system that provides the air interface to wireless devices 121-123 using multiple channels. Base station 110 may also use one or more transmitters. Base station 110 may also use one or more receivers. Base station 110 may be any wireless system that can provide an air interface to wireless devices 121-123. Base station 110 may use communication aspects specified by the WiMAX specification including, but not limited to, channel bandwidths detailed therein. Examples of base stations that may be utilized include, base transceiver stations (BTSs), radio base stations (RBSs), Node B, enhanced Node B (eNBs) and others. Base stations may include a number of elements known to those skilled in the art comprising transceivers, power amplifiers, combiner, duplexer, and antennas. Base station 110 may also include other additional components such as a control function or control computer. However, these additional components have been omitted from FIG. 1 for the sake of brevity.

Network 150 may be any network or collection of networks that couple, link, or otherwise operatively connect base station 110 with other devices or systems. Network 150 may include other secondary data networks. In an example, network 150 may include a backhaul network, a local network, a long distance network, a packet network, the internet, or any combination thereof, as well as other types of networks.

In an example, network 150 may be, or include all or parts of an IEEE 802.16 (WiMAX) specified system. These parts may include additional base stations (BSs), an access services network (ASN), access services network gateway (ASN-GW), or connectivity service network (CSN).

In an embodiment, wireless device 121 is using a first frequency band. A frequency band may also be referred to as a channel. Wireless device 122 is using a second channel. Wireless device 121 may report to communication system 100 a first location and a signal quality indicator associated with the first location and the first frequency band. Wireless device 122 may report to communication system 100 a second location and a signal quality indicator associated with the second location and the second frequency band. The first location and the second location may be within a defined area 140 of each other. Communication system 100 may store these signal quality indicators and associate them with their respective locations and frequency bands. These signal quality indicators may be, or be based on, a signal to interference and noise ratio (SINR).

To exchange communication services with network 150 via base station 110, wireless device 123 may request communication resources from base station 110. For example, wireless device 123 may request to communicate a packet with base station 110. In another example, wireless device may request an allocation of communication resources from base station 110. This request may be for an allocation of a service flow. The service flow may be associated with voice services and/or data services. These voice and data services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

To receive one or more of these services, traffic flows may be exchanged between wireless device 123 and base station 110. These traffic flows may have one or more service flow classifications. For example, base station 110 may exchange a traffic flow with wireless device 123 that includes a service traffic flow classification for voice service and a service traffic flow classification for a web browsing service. The service traffic flow classifications for voice service and for web browsing service may have different quality of service (QoS) requirements. In an embodiment, the traffic flows for these services have different service flow classifications.

In an embodiment, the service flow classifications may include wireless traffic classifications. For example, for WiMAX wireless communication there are wireless traffic quality of service classifications that include: unsolicited grant service (UGS), real time polling service (rtPS), extended real time polling service (ertPS), non-real time polling service (nRTPS), and best effort (BE).

Communication system 100 may determine a location for wireless device 123. Communication system 100 may retrieve the first and second locations in order to determine that wireless device 123 is located within a defined area 140 of the first and second locations. Once communication system 100 determines that wireless device 123 is within a defined area 140 of wireless device 123, communication system 100 may select the first or second frequency band based on the first and second signal quality indicators received from wireless device 121 and wireless device 122, respectively. In other words, communication system 100 may select the frequency band that wireless device 123 is to use based on two things: (1) the location of wireless device 123; and, (2) reported signal quality indicators for the candidate frequency bands that were reported in the vicinity of the current location of wireless device 123.

Once communication system 100 has selected a frequency band for wireless device 123 to use, wireless device 123 may be instructed to use that frequency band. For example, communication system 100 may select the first frequency band. Wireless device 123 may then be instructed by communication system 100 to use the first frequency band for the requested communication services.

In an embodiment, communication system 100 may select a frequency band for a traffic flow to use based on the location of wireless device 123 and reported signal quality indicators for the candidate frequency bands that were reported in the vicinity of the current location of wireless device 123. Wireless device 123 may be instructed to use that frequency band for that traffic flow. Thus, wireless device 123 may use several different frequency bands for several different traffic flows.

In an embodiment, communication system 100 may select or reselect frequency bands for traffic flows based on the quality of service requirements of the traffic flows, the location of wireless device 123, and reported signal quality indicators for the candidate frequency bands that were reported in the vicinity of the current location of wireless device 123. Thus, communication system 100 may assign the traffic flows associated with wireless device 123 such that the frequency bands with the best signal quality are used for the traffic flows that require the best quality of service.

Once wireless device 123 is operating using the first frequency band, wireless device 123 may report a signal quality indicator to communication system 100. This signal quality indicator may satisfy a criteria that indicates the first frequency band is inadequate. In this case, communication system 100 may select a new frequency band (e.g., the second frequency band). Wireless device 123 may be instructed to use this new frequency band for the requested communication services. The new frequency band may be selected based on reported signal quality indicators for the candidate frequency bands that were reported in the vicinity of the current location of wireless device 123. The reported signal quality indicators may be received from wireless device 123 or other wireless devices (e.g., wireless devices 121 and 122).

In an embodiment, communication system 100 may use a calibration process to build a database of location, channel, and signal quality indicator associations. This calibration process may be performed using a wireless device 121-123 while it is not sending or receiving packets. This calibration process may include determining a location for, and requesting a signal quality indicator from, a wireless device 121-123 while it using a channel. The wireless device 121-123 may then be requested to switch to a new channel. The wireless device 121-123 may then be requested to provide a signal quality indicator while it is using the new channel. This process may be repeated for each available channel.

To determine locations for wireless devices 121-123 when associating these locations with a signal quality indicator, communication system 100 may estimate locations for each of the wireless devices 121-123. There are a variety of methods that may be used to estimate locations for wireless devices 121-123. These methods may be used alone or in combination with each other or other methods. These methods may be based on round-trip delay time, triangulation, or signals received by a wireless device 121-123 from a global positioning system (GPS). In the case of a GPS system, a wireless device 121-123 may communicate its estimated position to base station 110 based on the signals it received from the GPS system.

In an embodiment, the estimated positions may be used to calculate distances from wireless device 123 to stored locations associated with signal quality indicators reported by a wireless device 121-123. Thus, the defined area 140 (or vicinity) may be expressed as a circle with a defined radius. Those wireless devices 121-122 who reported estimated locations within a defined radius of wireless device 123 may be considered to be within the defined area 140.

Figure 2:
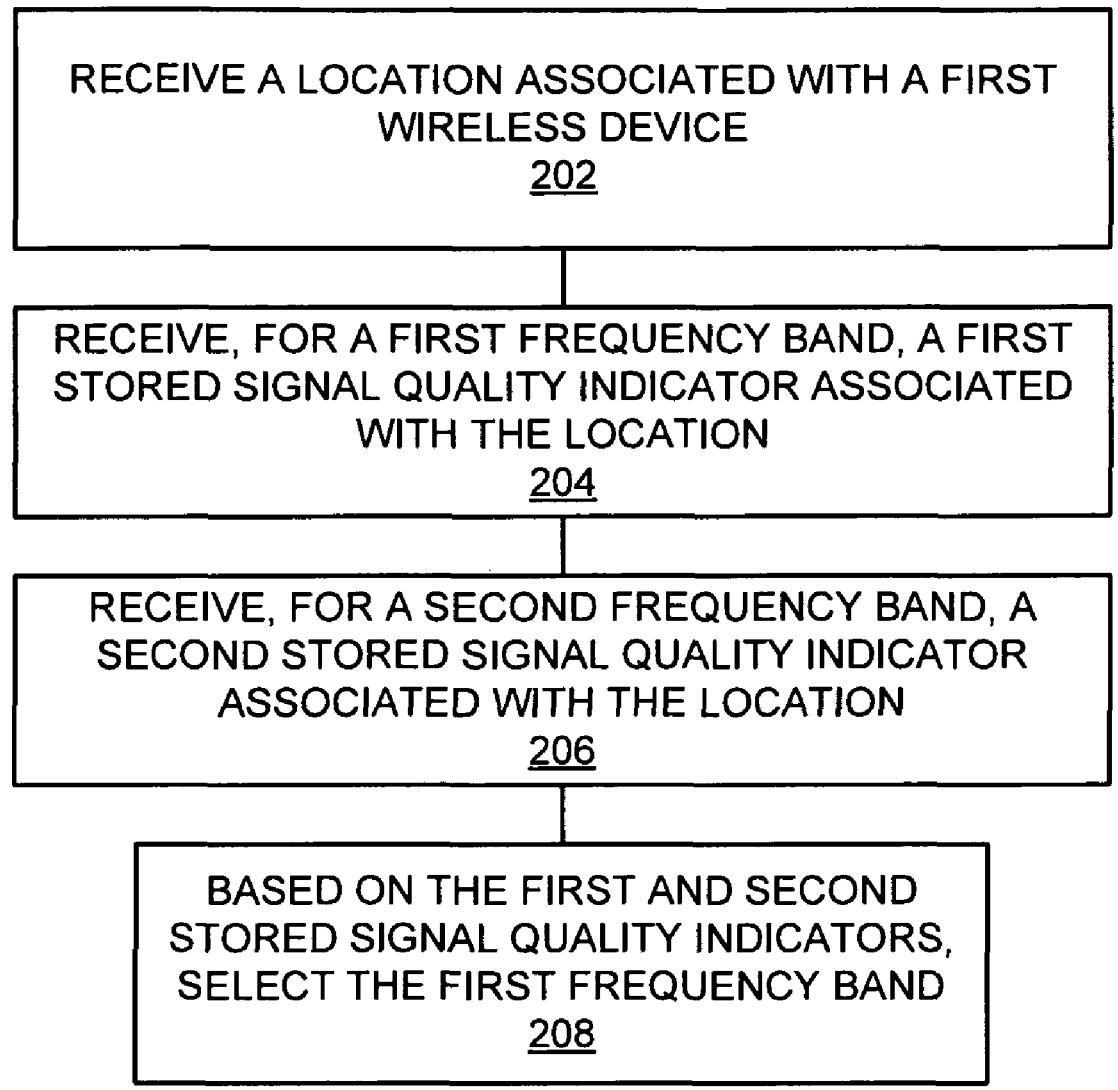
FIG. 2 is a flowchart illustrating a method of operating a communication system.

FIG. 2 is a flowchart illustrating a method of operating a communication system. The method illustrated in FIG. 2 may be performed by one or more elements of communication system 100.

A location associated with a first wireless device is received (202). For example, communication system 100 may receive a location associated with wireless device 123. For a first frequency band, a first stored signal quality indicator associated with the location may be received (204). For example, communication system 100 may receive a first stored signal quality indicator associated with defined area 140 and a first channel. This first stored signal quality indicator may have been reported to communication system 100 by any of wireless devices 121-123.

For a second frequency band, a second stored signal quality indicator associated with the location may be received (206). For example, communication system 100 may receive a second stored signal quality indicator associated with defined area 140 and a second channel. This second stored signal quality indicator may have been reported to communication system 100 by any of wireless devices 121-123.

Based on the first and second stored signal quality indicators, the first frequency band is selected (208). For example, communication system 100 may select the first channel for wireless device 123 to use based on the first and second signal quality indicators received in blocks 204 and 206, respectively. The first channel may be selected over the second channel because it has a higher SINR as indicated by the first and second signal quality indicators.

Figure 3:
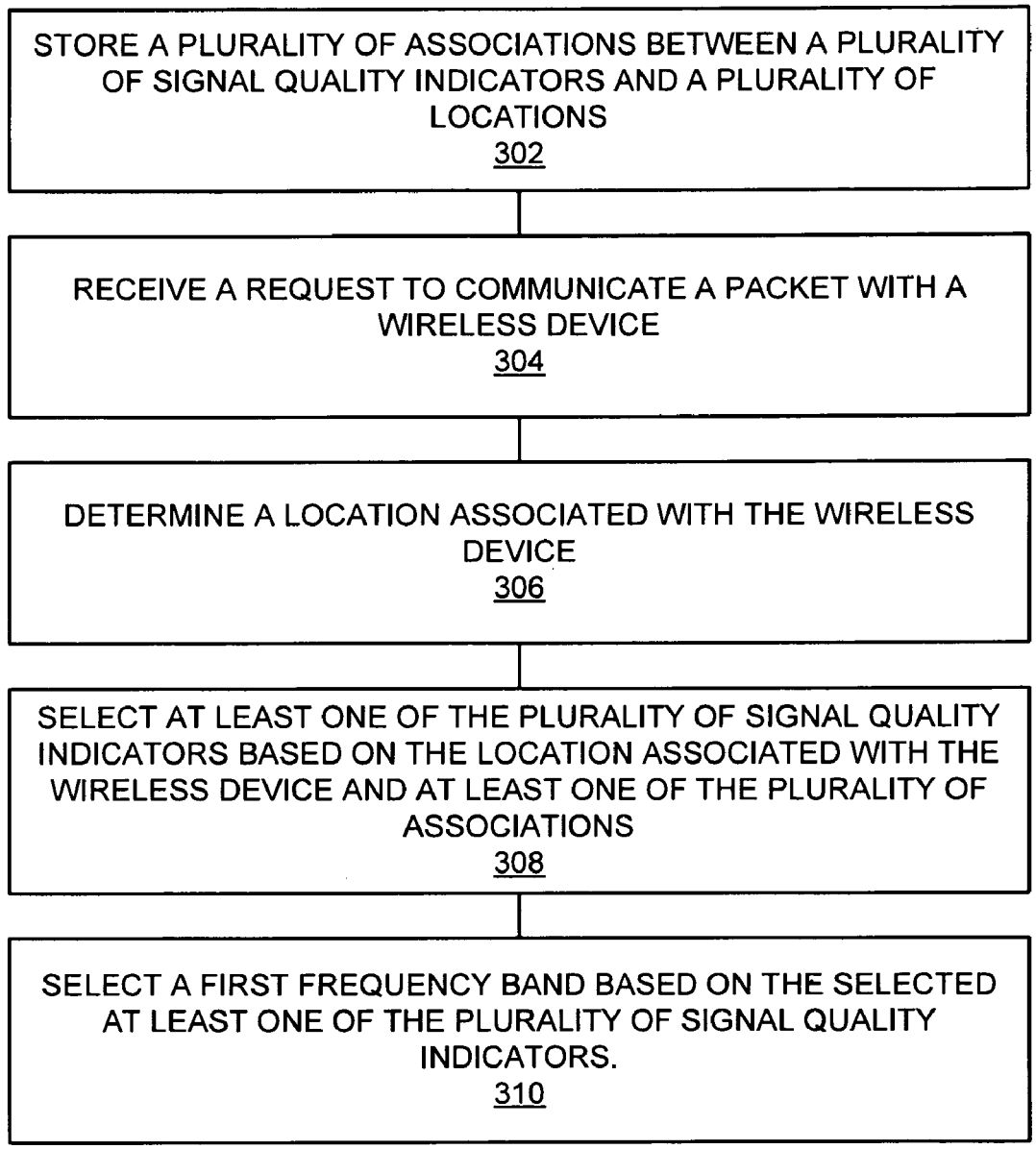
FIG. 3 is a flowchart illustrating a method of selecting a frequency band.

FIG. 3 is a flowchart illustrating a method of selecting a frequency band. The method illustrated in FIG. 3 may be performed by one or more elements of communication system 100.

A plurality of associations between a plurality of signal quality indicators and a plurality of locations is stored (302). For example, communication system 100 may store the signal quality indicators reported by wireless devices 121-123, their locations, and channels of operation. A request to communicate a packet with a wireless device is received (304). For example, a request to communicate a packet to or from wireless device 123 may be received.

A location associated with the wireless device is determined (306). For example, a location associated with wireless device 123 may be determined. The location associated with wireless device 123 may be received from wireless device 123. In another example, the location associated with wireless device 123 may be received from a database of recently reported locations. In another example, communication system 100 may estimate a location for wireless device 123. Methods for estimating a location for wireless devices 121-123 are described previously.

At least one of the plurality of signal quality indicators is selected based on the location associated with the wireless device and at least on of the plurality of associations (308). For example, the signal quality indicator associated with the best RF conditions in the vicinity of wireless device 123. This signal quality indicator may be selected regardless of the channel it is associated with. In another example, a set of the most recent signal quality indicators in the vicinity of wireless device 123 may be selected.

A first frequency band is selected based on the selected at least on of the plurality of signal quality indicators (310). For example, communication system 100 may select a first channel based on the signal quality indicator(s) selected in block 308. Communication system 100 may select the first channel based on a variety of factors associated with the signal quality indicators. These factors may include, but are not limited to, the SINR, the reporting device, the proximity of the reporting device to the wireless device, and the age of the report.

Figure 4:
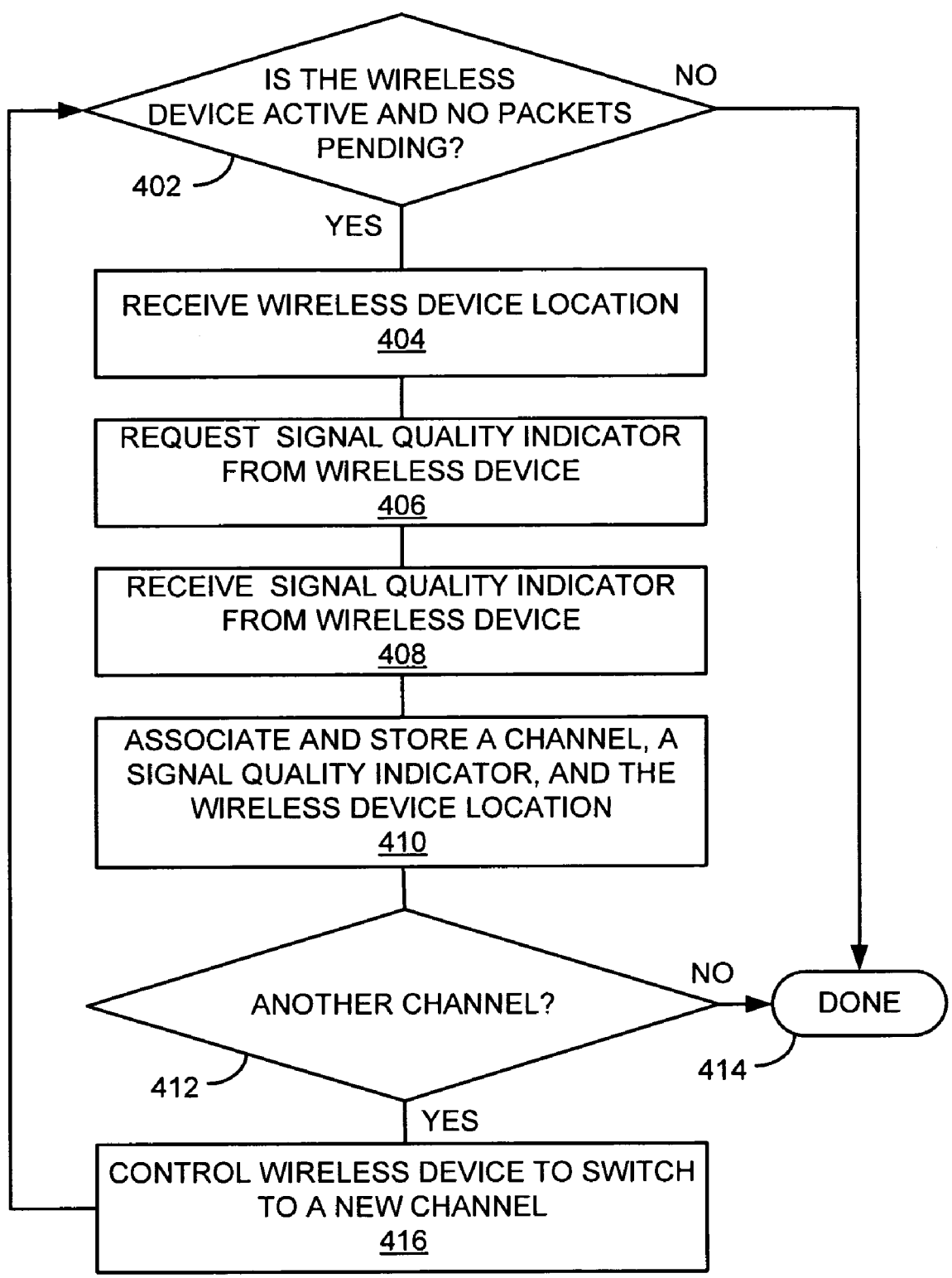
FIG. 4 is a flowchart illustrating a method of calibrating associations between signal quality indicators and locations.

FIG. 4 is a flowchart illustrating a method of calibrating associations between signal quality indicators and locations. The method illustrated in FIG. 4 may be performed by one or more elements of communication system 100.

It is determined if the wireless device is active and has no packets pending (402). If the wireless device is not active, or if it has packets pending, the procedure ends by proceeding to block 414. If the wireless device is active and has no packets pending, flow proceeds to block 404. For example, communication system 100 may determine that wireless device 123 is active and has no packets pending. However, if communication system 100 determines that wireless device 123 is not active, or if wireless device 123 has packets pending, communication system 100 will not continue with the calibration.

The location of the wireless device is received (404). For example, communication system 100 may receive a location associated with wireless device 123. The location of wireless device 123 may be an estimated location. A signal quality indicator is requested from the wireless device (406). For example, a signal quality indicator may be requested from wireless device 123. This signal quality indicator may be associated with the channel that wireless device 123 is using.

A channel, a signal quality indicator, and the wireless device location are associated and stored (410). For example, communication system 100 may associate and store the channel wireless device 123 is using, the signal quality indicator received from wireless device 123, and the estimated location of wireless device 123. If there are no further channels to calibrate, the procedure ends by proceeding to block 414. If there are more channels to calibrate, the procedure proceeds to block 416 (412).

The wireless device is controlled to switch to a new channel (416). For example, wireless device 123 may be controlled by communication system 100 to switch from the first channel to the second channel. Flow may then proceed to block 402 to calibrate the second channel.

Figure 5:
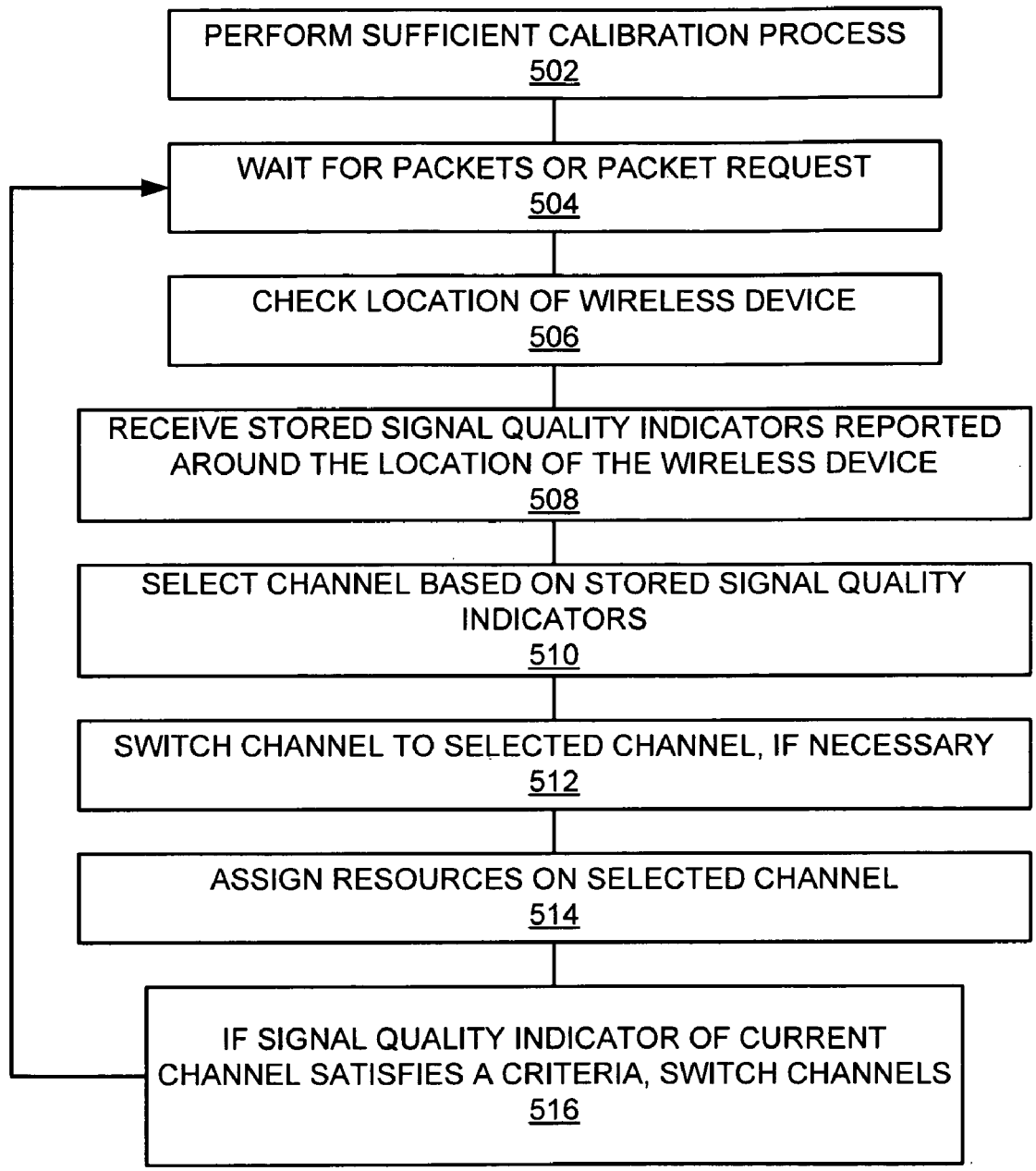
FIG. 5 is a method of assigning resources on a channel to a wireless device.

FIG. 5 is a method of assigning resources on a channel to a wireless device. The method illustrated in FIG. 5 may be performed by one or more elements of communication system 100.

A sufficient calibration process is performed (502). For example, communication system 100 may control one or more wireless devices 121-123 to perform a sufficient calibration process. This calibration process may include the method illustrated in FIG. 4. A sufficient calibration process may be defined to include at least one signal quality indicator being associated with each available channel and the location associated with the wireless device.

A wait for packets or a packet request is performed (504). After a packet or packet request is received, the location of the wireless device is checked (506). For example, communication system 100 may request and/or receive the location of wireless device 123. Stored signal quality indicators that were reported around the location of the wireless device are received (508). For example, stored signal quality indicators that give indications of RF conditions on multiple channels around the location of wireless device 123 may be received from a database.

A channel is selected based on the stored signal quality indicators (510). For example, communication system 100 may select a channel for wireless device 123 to used based on the stored signal quality indicators received in block 508. In an example, communication system 100 may select the channel with a stored signal quality indicator that indicates the best RF conditions around the location of wireless device 123.

If necessary, the channel is switched to the selected channel (512). For example, if wireless device 123 is not operating on the selected channel, wireless device 123 may be controlled by communication system 100 to switch to the selected channel. If wireless device 123 is already operating on the selected channel, this step may be skipped. Resources are assigned on the selected channel (514). For example, communication system 100 may assign air-interface resources on the selected channel to wireless device 123. These air-interface resources may be assigned to provide communication services to wireless device 123. These communication services may be associated with traffic flows. These traffic flows may be associated with service flow classifications.

If a signal quality indicator of the current channel satisfies a criteria, switch channels (516). For example, if the signal quality indicator associated with the selected channel indicates poor RF conditions (e.g., below a threshold), communication system 100 may control wireless device 123 to switch channels. Flow proceeds to block 504.

The methods, systems, devices, networks, and base stations described above may be implemented with, contain, or be executed by one or more computer systems. The methods described above may also be stored on a computer readable medium. Many of the elements of communication network 100 may be, comprise, or include computers systems. This includes, but is not limited to: base station 110, wireless device 121, wireless device 122, wireless device 123, and network 150.

Figure 6:
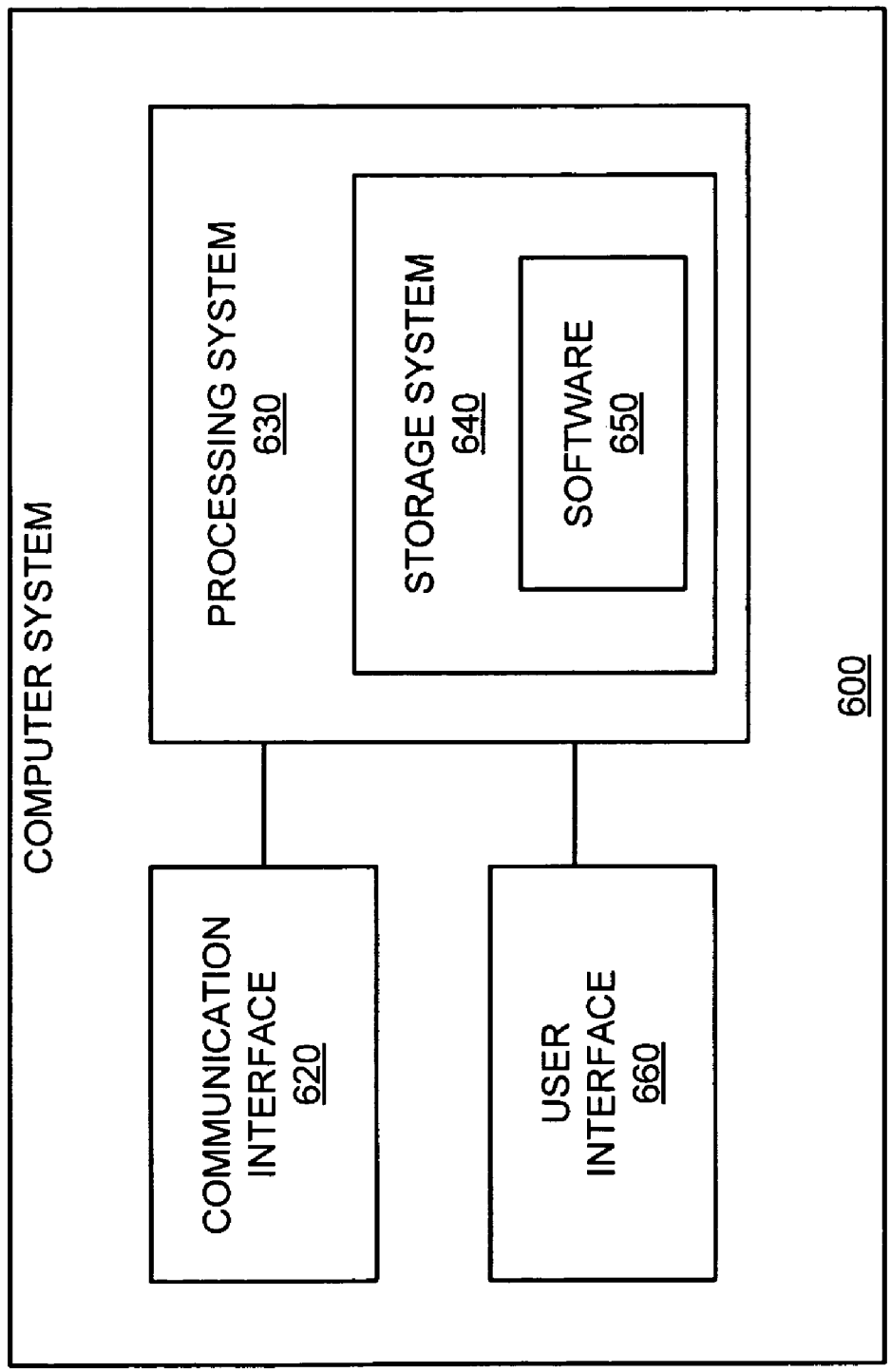
FIG. 6 is a block diagram of a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    receiving a first location associated with a first wireless device;
    determining a defined area, the defined area being an area surrounding the first wireless device and being defined based on a distance from the first location associated with the first wireless device;
    receiving, for a first frequency band, a first stored signal quality indicator associated with a second location located within the defined area;
    receiving, for a second frequency band, a second stored signal quality indicator associated with one of the second location and a third location located within the defined area; and,
    selecting, based on the first stored signal quality indicator and the second stored signal quality indicator, the first frequency band.

2. The method of claim 1, further comprising:
    receiving, from the first wireless device, a signal quality indicator associated with the first frequency band.

3. The method of claim 2, further comprising:
    selecting, based on the signal quality indicator satisfying a criteria, the second frequency band.

4. The method of claim 1, further comprising:
    communicating with the first wireless device using the first frequency band; and, receiving, from the first wireless device, a signal quality indicator associated with the first frequency band.

5. The method of claim 4, further comprising:
based on the signal quality indicator, communicating with the first wireless device using the second frequency band.

6. The method of claim 1, further comprising:
requesting a first signal quality indicator that is associated with the first frequency band from a second wireless device;
associating the first signal quality indicator with the defined area;
storing the first stored signal quality indicator based on the first signal quality indicator.

7. The method of claim 6, further comprising:
requesting a second signal quality indicator that is associated with the second frequency band from the second wireless device;
associating the second signal quality indicator with the defined area;
storing the second stored signal quality indicator based on the second signal quality indicator.

8. The method of claim 7, wherein the steps of requesting a first signal quality indicator and requesting a second signal quality indicator are performed when the second wireless device is not scheduled to communicate a packet.

9. A method of operating a communication system, comprising:
storing a plurality of associations between a plurality of signal quality indicators and a plurality of locations;
receiving a request to communicate a packet with a wireless device;
determining a location associated with the wireless device;
determining a defined area, the defined area being an area surrounding the first wireless device and being defined based on a distance from the location associated with the first wireless device;
selecting, based on the defined area and at least one of the plurality of associations between the plurality of signal quality indicators and a set of the plurality of locations located within the defined area, at least one of the plurality of signal quality indicators; and,
based on the selected at least one of the plurality of signal quality indicators, selecting a first frequency band.

10. The method of claim 9, further comprising:
receiving, from the wireless device, a signal quality indicator associated with the first frequency band.

11. The method of claim 10, further comprising:
selecting a second frequency band based on the signal quality indicator satisfying a criteria.

12. The method of claim 9, further comprising:
communicating the packet with the wireless device using the first frequency band; and,
receiving, from the wireless device, a signal quality indicator associated with the first frequency band.

13. The method of claim 12, further comprising:
based on the signal quality indicator, communicating with the wireless device using a second frequency band.

14. The method of claim 13, further comprising:
associating the signal quality indicator with the defined area; and,
storing the association between the signal quality indicators and the defined area.

15. A communication system, comprising:
a wireless station that communicates with a wireless device using a first frequency band and switches to communicating with the wireless device using a second frequency band; and,
the communication system determining a location associated with the wireless device, determining a defined area that is an area surrounding the wireless device and defined based on a distance from the location associated with the wireless device and retrieving a first stored signal quality indicator associated with a second location located within the defined area and the first frequency band and a second stored signal quality indicator associated with one of the second location and a third location located within the defined area and the second frequency band, the communication system causing the wireless station to switch to communicating with the wireless device using the second frequency band based on the first stored signal quality indicator and the second stored signal quality indicator.

16. The communication system of claim 15, wherein a signal quality indicator associated with the second frequency band is received from the wireless device.

17. The communication system of claim 16 wherein the wireless station switches back to communicating with the wireless device using the first frequency band based on the signal quality indicator satisfying a criteria.

18. The communication system of claim 15, wherein the wireless station requests a first signal quality indicator that is associated with the first frequency band from a second wireless device, and the communication system associates the first signal quality indicator with the defined area.

19. The communication system of claim 18, wherein the communication system stores the first stored signal quality indicator based on the first signal quality indicator.

20. The communication system of claim 18, the wireless station requests a second signal quality indicator that is associated with the second frequency band from the second wireless device, and the communication system associates the second signal quality indicator with the defined area.

* * * * *